United States Patent [19]
Matsubara et al.

[11] Patent Number: 5,093,676
[45] Date of Patent: Mar. 3, 1992

[54] METHOD OF DRIVING ELECTRO-OPTICAL LIGHT SHUTTER FOR USE IN RECORDING APPARATUS

[75] Inventors: Ken Matsubara; Itaru Saito; Hirohisa Kitano; Kouichi Shingaki; Tomohiko Masuda; Kenichi Wada; Koji Wakamiya; Tsukasa Yagi; Atsushi Fujita, all of Osaka, Japan

[73] Assignee: Minolta Camera Kabushiki Kaisha, Osaka, Japan

[21] Appl. No.: 481,879

[22] Filed: Feb. 20, 1990

Related U.S. Application Data

[63] Continuation-in-part of Ser. No. 262,606, Oct. 26, 1988, Pat. No. 4,902,111.

[30] Foreign Application Priority Data

Jun. 30, 1989 [JP] Japan ................................. 1-170965

[51] Int. Cl.$^5$ ............................................. G01D 15/14
[52] U.S. Cl. ..................................... 346/160; 346/1.1; 346/154
[58] Field of Search ................ 376/154, 160; 350/384, 350/389, 374, 393; 346/108, 1.1; 358/300, 302

[56] References Cited

U.S. PATENT DOCUMENTS

| | | | |
|---|---|---|---|
| 3,806,228 | 4/1974 | Imagawa et al. | 350/150 |
| 4,154,505 | 5/1979 | Kato et al. | 350/150 |
| 4,591,886 | 5/1986 | Umeda et al. | 346/160 |
| 4,902,111 | 2/1990 | Matsubara et al. | 350/393 |

FOREIGN PATENT DOCUMENTS

| | | |
|---|---|---|
| 58-31315 | 1/1983 | Japan . |
| 58-82223 | 5/1983 | Japan . |
| 60-83008 | 5/1985 | Japan . |
| 60-103326 | 6/1985 | Japan . |
| 1534027 | 11/1978 | United Kingdom . |

*Primary Examiner*—Benjamin R. Fuller
*Assistant Examiner*—Randy W. Gibson
*Attorney, Agent, or Firm*—Burns, Doane, Swecker & Mathis

[57] ABSTRACT

A method of driving an electro-optical light shutter for use in a recording apparatus. According to the method, an electric field of a predetermined direction is applied to the light shutter during a recording period and a further electric field having a direction opposite to the predetermined direction is applied to the light shutter during a waiting period.

14 Claims, 20 Drawing Sheets

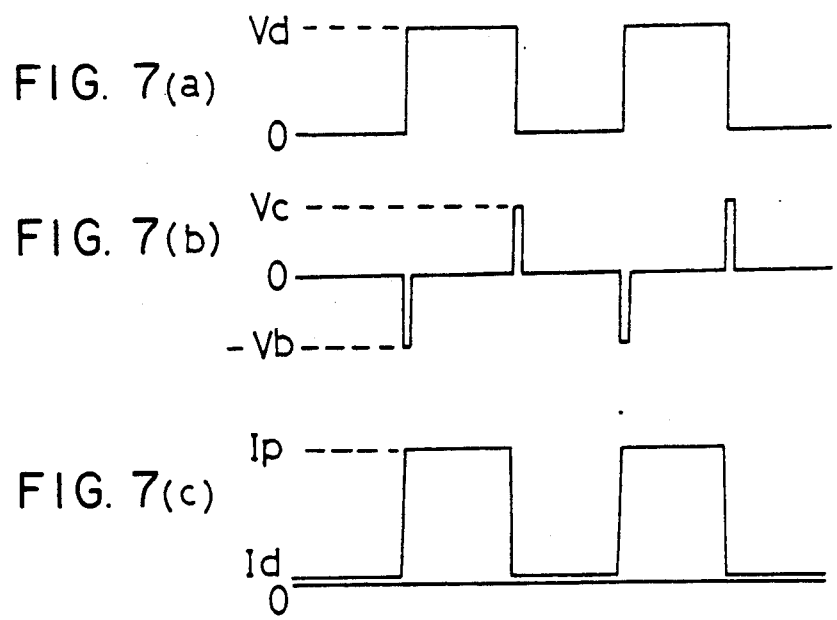
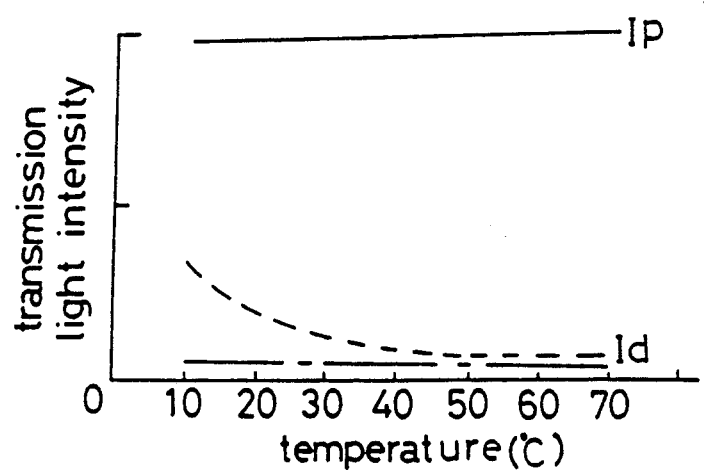

METHOD OF DRIVING ELECTRO-OPTICAL LIGHT SHUTTER FOR USE IN RECORDING APPARATUS

This application is a continuation-in-part application of U.S. Ser. No. 07/262,606, filed on Oct. 26, 1988 now U.S. Pat. No. 4,902,111.

BACKGROUND OF THE INVENTION

1) Field of the Invention

The present invention relates to a method of driving a light shutter for use in a recording apparatus such as an optical printer. The light shutter has an electro-optical effect to polarize an incident light by applying an electric field thereto.

2) Description of the Prior Art

A known light shutter array of the above-noted type using such material as PLZT having an electro-optical effect, comprises a polarizer and an analyzer which are respectively constituted by a polarizing plate and are disposed at a light incident side and at a light emitting side with polarizing angles thereof crossing at a right angle to each other. For a light transmission therethrough, a driving voltage is applied to electrodes disposed at opposed sides of the shutter array, such that the light incident to the shutter array, such that the light incident to the shutter through the polarizer undergoes 90 degree polarization in the shutter then to be transmitted through the analyzer.

Further, in order to increase a transmission light intensity difference between an ON state and an OFF state of the shutter, a half-wavelength voltage for polarizing the light by 90 degrees is employed as the shutter driving voltage applied between the electrodes in accordance with the 90 degree polarizing angle difference between the polarizer and the analyzer.

Then, the inventors of the present invention thought of using such a light shutter array but also including a plurality of serially aligned light shutter elements in an electrophotographic printer and have conducted intensive research on this application.

In using such a light shutter array in an electrophotographic printer, as shown in FIG. 1, a polarizer 101 and an analyzer 102 are disposed respectively at the light-incident side and at the light-emitting side across the light shutter array 10. A light from a light source lamp 103 and its reflecting mirror 104 is guided through the polarizer 101 to the shutter array 10, in which some light shutter elements are driven depending on the image information so as to permit selective transmission of this light through the analyzer 102. This light through the analyzer 102 is converged by a converging rod lens array 105 to be irradiated onto a periphery of a photosensitive member 107 uniformly charged by a corona charger 106, whereby an electrostatic latent image is formed on the periphery. Then, this latent image is developed through a developing device 108 into a toner image, which image is transferred through a transfer device 109 onto a copy sheet while removing excess toner remaining on the peripheral surface of the photosensitive member 107 by an eraser 110 and a cleaner 111.

In the above-described construction of the light shutter array employed in the electrophotographic printer, the respective shutter elements need to be selectively driven by pulses in order to form the electrostatic latent image on the photosensitive member being rotated at a predetermined peripheral speed.

Thus, the inventors conducted research on ambient temperature variations in a transmission light intensity $I_p$ under the ON state of the shutter and a leakage light intensity $I_d$ under the OFF state of the same. As shown in FIG. 2, the research revealed that the transmission light intensity $I_p$ is hardly effected by an ambient temperature variations whereas the leakage light intensity $I_d$ increases with a decrease in the temperature and further that this leakage light intensity $I_d$ under the OFF state of the shutter significantly increases as shown in FIG. 3 if the light shutter is driven at a temperature lower than the room temperature.

Moreover, the research revealed, as indicated by a broken line in FIG. 4, that the leakage light intensity also increases due to generation of polarization in the respective shutter elements if the shutter array is continuously driven by constantly applying a undirectional pulsating electric field thereto even if the ambient temperature is maintained constant.

A primary object of the invention is to provide an improvement in a driving method of an electro-optical light shutter wherein the method enables the light shutter to consistently achieve good performance.

A further object of the invention is to provide a driving method of an electro-optical light shutter wherein the method can effectively prevent variation in transmission light amount when a recording operation is repeated for a plurality of times.

A still further object of the invention is to provide a driving method of an electro-optical light shutter wherein the method is suitable for use in an electrophotographic printer.

SUMMARY OF THE INVENTION

For accomplishing the above-noted objects, according to the present invention, a method of driving an electro-optical light shutter for use in a recording apparatus, the method comprises the steps of: applying an electric field of a predetermined direction to the light shutter during a recording period; and applying to the light shutter a further electric field of a direction opposite to the predetermined direction during a waiting period.

The foregoing and other objects, features and advantages of the invention will be apparent from the following more particular description of preferred embodiments of the invention, as illustrated in the accompanying drawings.

BRIEF DESCRITPION OF THE DRAWINGS

FIGS. 1 through 8 concern an embodiment (1) of the invention; in which,

FIG. 1 is a schematic view illustrating a light shutter array employed as a recording device used in an electrophotographic printer, FIG. 2 is a graph illustrating variations of a transmission light intensity with ambient temperature and a leakage light intensity when the light shutter is pulse-driven with varying the ambient temperature, FIG. 3 is a graph illustrating variations in transmission light intensity when the light shutter is pulse-driven at a temperature lower than the room temperature, FIG. 4 is a graph illustrating the relationship between the number of driving pulse voltages applied to individual electrodes of the light shutter and the leakage light intensity at the OFF state of the shutter, FIG. 5 is a circuit diagram illustrating a case where a common electrode of the light shutter array is connected to a bias driving circuit, FIG. 6 is a timing chart illustrating a light shutter driving method according to the embodiment (1) of the present invention, FIG. 7 is a timing chart illustrating a modified driving method of the embodiment (1), FIG. 8 is a graph illustrating variations in the leakage light intensity with ambient temperature when the light shutter is pulse-driven by the driving method of this embodiment, FIGS. 9A, 9B and 10 concern an embodiment (2) of the invention; in which, FIGS. 9A and 9B are circuit diagrams illustrating circuit switch-over conditions in a recording time period and in a waiting time period the light shutter array respectively, FIG. 10 is a timing chart illustrating states of driving pulse voltage to be applied to the light shutter in the recording time period and the waiting time period, FIGS. 11 through 13B concern an embodiment (3) of the invention; in which, FIG. 11 is a block diagram of the circuitry for driving the light shutter array, FIG. 12 is a timing chart for driving the light shutter array, FIGS. 13A and 13B are views respectively showing driving conditions of the light shutter array in a time period T1 and in a time period T2 of the timing chart of FIG. 12, FIGS. 14 through 17 concern an embodiment (4) of the invention; in which, FIG. 14 and FIG. 15 are block diagrams of circuitry for driving the light shutter array, FIG. 16 is a timing chart for driving the light shutter array, FIG. 17 is a timing chart illustrating the driving conditions of the light shutter by way of example of an output terminal HVO1 of a driver, FIGS. 18 through 23 concern an embodiment (b 5) of the invention; in which, FIG. 18 is a block diagram of the circuitry for driving the light shutter array, FIG. 19 is a timing chart for driving the light shutter array, FIG. 20 is a graph illustrating a relationship between the driving voltage applied to the individual electrode of the light shutter and transmission light amount of the shutter, FIG. 21 is a graph illustrating a relationship between a duty ratio of a clock signal during a recording time peirod and an optimum driving voltage to be applied to the common electrode of the light shutter during a waiting time period, FIG. 22 is a block diagram of the circuitry for driving the light shutter array relating to a modified arrangement of the embodiment (5), FIG. 23 is a timing chart illustrating a shutter driving method according to the modified arrangement of the embodiment (5), FIGS. 24 through 27 concern an embodiment (6) of the invention; in which, FIG. 24 is a timing chart for driving the light shutter array, and FIGS. 25 through 27 are timing charts illustrating states of driving pulse voltage to be applied to the light shutter in the recording period and the waitng period, according to various modified arrangements of the embodiment (6), respectively.

DESCRIPTION OF THE PREFERRED EMBODIMENTS

Preferred embodiments of the present invention will be particularly described hereinafter with reference to the accompanying drawings.

In these embodiments (1) through (6), respective light shutter elements constituting a light shutter array are formed of PLZT which is an example of material having an electro-optical effect and has advantageous characteristics of quick response and relatively low voltage drivability.

Embodiment (1)

In this embodiment, shown in FIG. 5 the light shutter array 10 comprises the plurality of light shutter elements 1 each including a plurality of individual electrodes 2 of one polarity and a common electrode 3. The individual electrodes 2 are connected to a driving circuit 4 independently of each other while the common electrode 3 is connected to a bias driving circuit 5.

In operation, as shown in (a) and (b) of FIG. 6, after a driving pulse voltage Vd is applied from the driving circuit 4 to some of the individual electrodes 2 thereby driving the light shutter 1, in synchronism with a negative edge of this driving pulse voltage Vd, a pulse voltage Vc is applied from the bias driving circuit 5 to the common electrode 3 with the pulse voltage Vc having the same polarity as and a sufficiently shorter pulse width than the driving pulse voltage Vd. With this application of the voltage Vc, an electric field of the opposite direction to that in the shutter ON state acts on the light shutter elements 1. In the above-described shutter driving operation, it was observed, as shown in (c) of FIG. 7, that with the negative edge of the driving pulse voltage Vd the transmission light intensity IP as indicated by a solid line sharply drops and the leakage light intensity Id under the OFF shutter state drops as well.

Next, in a modified arrangement of this embodiment 1 shown in FIG. 7, in synchronism with the application of the driving pulse voltage Vd to the individual electrodes 2 of the light shutter 1 and only at the initial stage of the driving operation, a negative pulse voltage —Vb having a pulse width sufficiently shorter than the pulse voltage Vd is applied from the bias driving circuit 5 to the common electrodes 3. Thereafter, in the same manner as in the previous arrangement, in synchronism with a negative edge of the driving pulse voltage Vd, the drop-triggering pulse voltage Vc having the same polarity as and a sufficiently shorter pulse width than the voltage Vd is applied to the common electrode 3. In the light shutter driving operation according to this arrangement, it was observed, as shown in (c) of FIG. 7, that the rise of the transmission light intensity Ip at the initial stage of shutter driving operation is quickened and also that this transmission light intensity Ip sharply drops with a negative edge of the driving pulse voltage Vd and the leakage light intensity Id also drops.

Using the same arrangements as above, a further research was conducted on variations of the leakage light intensity with varying the shutter driving temperature. The research revealed the following. That is, in the embodiment (1), if the pulse voltage Vc having the same polarity as, and a sufficiently shorter pulse width than, the driving pulse voltage Vd is applied to the common electrode 3 in synchronism with a negative edge of the voltage Vd, as indicated by an alternate long and short dash line in FIG. 8, there is observed a decrease in the leakage light intensity Id compared with the case indicated by a broken line with no application of the drop-triggering pulse voltage. In this case, it is also observed that the leakage light intensity Id does not increase and is constantly maintained at a low value even if the light shutter is driven at a low temperature.

Embodiment (2)

In this embodiment (2), as shown in FIGS. 9A and 9B, individual light shutter elements 11-1, 11-2, ... 11-n of the light shutter array 10 are connected to respective drivers 20-1, 20-2, ... 20-n independently of each other, whereas a common electrode 12 of the respective elements 11-1, 11-2, ... 11-n is connected to a selector switch 23, such that the common electrode 12 may be selectively connected with a ground (GND) 24 or with an alternating voltage generating circuit 25.

For an image forming operation on the photosensitive member in the electrophotographic printer shown in FIG. 1 using this light shutter array 10, as shown in FIG. 9A, the selector switch 23 is switched over to the GND 24 for connecting the common electrode 12 to the GND 24. Then, in accordance with object image information, the image data is transferred in parallel from the respective drivers 20-1, 20-2, ... 20-n to the light shutter elements 11-1, 11-2, ... 11-n thereby applying a driving voltage Vh only to individual electrodes 13-1, 13-2, ... 13-n of the selected light shutter elements 11. Then, the light transmitted through these selected shutter elements 11 is applied onto the periphery of the photosensitive member to record a latent copy image thereon.

After the above image recording operation on the photosensitive member, while maintaining the GND connection of the individual electrodes 13-1, 13-2, ... 13-n of the shutter elements 11-1, 11-2, ... 11-n, the selector switch 23 is switched over from the GND 24 to the alternating voltage generating circuit 25 thereby connecting the common electrode 12 to the alternating voltage generating circuit 25. Then, as illustrated in a timing chart of FIG. 10, during a waiting time period, an alternating voltage +Vh is applied from the alternating voltage generating circuit 25 to the common electrode 12 for providing electric fields of different directions to the respective light shutter elements 11-1, 11-2, ... 11-n. Thereafter, the selector switch 23 is again switched over from the alternating voltage generating circuit 25 to the GND 24, and the shutter array 10 is driven for recording a copy image on the periphery of the photosensitive member in the same manner as in the previous arrangement.

With the above-described arrangement for driving the shutter array 10 in which the alternating voltage +Vh is applied to the common electrode 12 during the waiting time period for applying the electric fields of different directions to the respective shutter elements 11-1, 11-2, ... 11-n, as indicated by the solid line in FIG. 4, the leakage light intensity is hardly changed and maintained at a low value even if the shutter array 10 is used repeatedly.

Incidentally, a square-wave alternating voltage +Vh is applied to the common electrode 12 during the waiting period in this embodiment. However, the wave shape of the voltage is not limited thereto but may be, e.g., a sine wave.

Embodiment (3)

In this embodiment (3), as shown in a block circuit diagram of FIG. 11, there is provided a two-input XOR logic gate 26 for transferring data to a shift register 21. This XOR gate 26 receives through one of its input terminals a first data DATA1 and through the other input terminal an output Q of a first flip-flop FF1 and outputs a second data DATA2 to be serially inputted to the shift register 21 in synchronism with a first clock signal CLOCK1.

The first flip-flop FF1 connected to the input terminal of the XOR gate 26 receives a second clock signal CLOCK2, in synchronism with which input the output Q of this flip-flop FF1 is toggled between 'HIGH' and 'LOW'. If this output Q is 'LOW', the XOR gate 26 outputs second data DATA2 of the same phase as the first data DATA1. On the other hand, if the output Q is 'HIGH', the XOR gate 26 outputs second data DATA2 of the inverted phase of the first data: DATA1.

After this second data DATA2 of the same phase as or the inverted phase of the first data DATA1 is transferred to the shift register 21 in the previously described manner, and a latch circuit 22 latches the second data DATA2 in synchronism with a latch signal: LATCH associated with the second clock signal CLOCK2. Then, by setting a driving signal CL to 'HIGH', the second data DATA2 latched at the latch circuit 22 is transferred in parallel from the driver 20 to the respective individual electrodes 13-1, 13-2, ... 13-n of the light shutter elements 11-1, 11-2, ... 11-n, thereby applying the voltage Vh only to these individual electrodes 13 of the selected shutter elements 11.

On the other hand, the common electrode 12 of the respective shutter elements 11-1, 11-2, ... 11-n is connected to a high-voltage driver 27 for generating the voltage Vh, with the driver 27 receiving an output Q of a second flip-flop FF2. This flip-flop FF2 receives a third clock signal CLOCK3, in synchronism with which input an output Q of this flip-flop FF2 is toggled between 'HIGH' and 'LOW'.

If the second data DATA2 transferred through the driver 20 is of the same phase as the first data: DATA1, the output Q of the second flip-flop FF2 is set to 'LOW', such that the high-voltage driver 27 does not generate the voltage Vh and the common electrode 12 is connected with the GND 24. On the other hand, if the second data DATA2 through the driver 20 is of the inverted phase of the first data: DATA1, the output Q of the second flip-flop FF2 is set to 'HIGH', such that the high-voltage driver 27 generates and applies the voltage Vh to the common electrode 12.

As described above, if the second data: DATA2 transferred through the driver 20 is of the same phase as the first data DATA1 and the common electrode 12 is connected with the GND 24, i.e., in a time period T1 shown in a timing chart of FIG. 12, only those shutter elements 11 whose individual electrodes 13 are provided with the voltage Vh in accordance with the second data DATA2 of the same phase as the first data DATA1 are driven for transmitting the light therethrough as shown in FIG. 13A.

On the other hand, if the second data DATA2 transferred through the driver 20 is of the inverted phase of the first data and the voltage Vh is applied to the common electrode 12, i.e., in a time period T2 of the timing chart of FIG. 12, as shown in FIG. 13B, those shutter elements 11 whose individual electrodes 13 are provided with the voltage Vh in accordance with the second data DATA2 of the inverted phase are not driven since the voltage of the individual electrodes equate with that of the common electrode 12 applied with the voltage Vh. Reversely, those shutter elements 11 whose individual electrodes 13 are not applied with the voltage Vh are driven for transmitting the light therethrough.

Accordingly, in this time period T2 also, the same or equivalent image recording operation based on the first data DATA1 is effected.

If the light shutter array 10 is driven with the above-described arrangement, during the time periods T1 and T2, the electric fields of different directions act on the driven shutter elements 11. And, if this is effected repeatedly, the electric fields of different directions act more evenly on the respective light shutter elements 11.

Consequently, as in the foregoing embodiment (1), even if the light shutter array 11 is used repeatedly, the leakage light intensity during the OFF state of the elements 11 hardly changes and is maintained at a low value.

Embodiment (4)

Referring now to block circuit diagrams of FIG. 14 and FIG. 15, in this embodiment (4) as in the previous embodiments, in the driver 20, data DATA is serially inputted to the shift register 21 in synchronism with the first clock signal CLOCK1 and is latched at the latch circuit 22.

Then, in this particular embodiment, output terminals of the latch circuit 22 are respectively connected to one of input terminals of respective two-input XOR gates 26-1, 26-2, . . . 26-n whereas the other input terminal of these respective gates is connected to a common line 28, through which the second clock signal CLOCK2 is transmitted.

If the second clock signal CLOCK2 is 'LOW', the input terminals connected to the common line 28 of the respective XOR gates 26-1, 26-2 . . . 26-n are set to 'LOW', whereby the data DATA transferred from the latch circuit 22 is outputted without being inverted from the output terminals of the respective XOR gates 26-1, 26-2, . . . 26-n. On the other hand, if the second clock signal CLOCK2 is 'HIGH', the input terminals connected to the common line 28 of the respective XOR gates 26-1, 26-2, . . . 26-n are set to 'HIGH', whereby the data DATA transferred from the latch circuit 22 is inverted and outputted from the output terminals of the respective XOR gates 26-1, 26-2, . . . 26-n.

Then, if the driving signal CL is set to 'HIGH', the output data of the same phase as or inverted phase of the data DATA outputted from the output terminals of the XOR gates 26-1, 26-2 . . . 26-n in synchronism with the second clock signal CLOCK2 as described above, is transferred directly, i.e. without its inversion from respective output terminals HVO1 through HVOn of the driver 20 thereby applying the voltage Vh to the individual electrodes 13 of the selected shutter elements 11. Incidentally, if the driving signal CL is 'LOW', all of the output terminals HVO1 through HVOn of the driver 20 are disabled.

Further, as shown in FIG. 15, the common electrode 12 of the respective light shutter elements 11-1, 11-2, . . . 11-n is connected to the high-voltage driver 27 for generating the voltage Vh, with the driver 27 being adapted to receive the second clock signal CLOCK2.

Then, as illustrated in a timing chart of FIG. 16, if this second clock signal CLOCK2 is 'LOW' and the data DATA from the latch circuit 22 is transferred directly from the respective output terminals HVO1 through HVOn of the driver 20, the high-voltage driver 27 does not generate the voltage Vh and the common electrode 12 is connected to the GND 24, whereby only those light shutter elements 11 whose individual electrodes 13 are applied with the voltage Vh are driven for transmitting the light therethrough.

On the other hand, if the second clock signal CLOCK2 is 'HIGH' and the data DATA from the latch circuit 22 is outputted with inversion from the respective output terminals HVO1 through HVOn of the driver 20, the high-voltage driver 27 applies the voltage Vh to the common electrode 12, whereby those shutter elements 11 whose individual electrodes 13 are applied with the voltage Vh are not driven since the voltage equates with that of the common electrode 12 whereas those shutter elements 11 whose individual electrodes 13 are not applied with the voltage Vh are driven by the voltage Vh applied to the common electrode 12 for transmitting the light therethrough. Consequently, in this case also, the image recording operation is effected based on the data DATA from the latch circuit 22.

The above operation will be more particularly described by taking one output terminal HVO1 of the driver 20 for example. As illustrated in a timing chart of FIG. 17, during a time period T1, the application of the voltage Vh from the output terminal HVO1 to the individual electrode 13 synchronizes with the application of the voltage Vh to the common electrode 12. For this reason, during the time period T1, the voltages across these electrodes 12 and 13 of the shutter element 11 equate with each other and this shutter element 11 is not driven. On the other hand, during a time period T2, the timing of the application of the voltage Vh from the output terminal HVO1 to the individual electrode 13 is opposite in phase to that of the application of the voltage Vh to the common electrode 12. Accordingly, the voltage Vh is applied to the light shutter element 11 for driving the same while its electric field is inverted in synchronism with the second clock signal CLOCK2.

In operation of the light shutter array 10 having the above-described arrangement, if the driving signal CL is 'HIGH', an electric field of different direction acts on the driven light shutter element 11 in synchronism with the second clock signal CLOCK2, and if this operation is repeated based on the data DATA, the application of the electric field of different direction acts evenly to some extent on the respective light shutter elements 11.

Consequently, in this embodiment (4) also, even if the light shutter array 10 is repeatedly used, the leakage light intensity at the OFF state of the respective shutter elements 11 hardly changes and is maintained at a low value.

Embodiment (5)

FIG. 18 shows driving circuitry for a light shutter array of this embodiment. In this drawing, each light shutter element 11 of a light shutter array 10 is shown as a capacitor.

Electrodes 13 are provided independently for the respective light shutter elements 11, while all the elements 11 share one common electrode 12.

For driving the light shutter array 10, a first driving circuit 29 is connected with the individual electrodes 13, whereas a second driving circuit 30 is connected with the common electrode 12.

The first driving circuit 29 includes a shift register 21 for serial input of each one line amount of image data to be recorded, a latch circuit 22 for latching the inputted data of the shift register 21 and a driver 20 for selectively applying a direct current voltage V1 (>0) to the individual electrodes 13 in accordance with the image data latched at the latch circuit 22. The driver 20 receives a clock signal CK for controlling the timing of applying the voltage V1 to the electrodes 13.

The second driving circuit 30 includes a transistor 31 which is energized to ground the common electrode 12 and a further transistor 32, which is energized with de-energization of the transistor 31, for applying a direct current voltage V2 (>0) to the common electrode 12. The transistor 31 receives, through its base, a signal S1 which becomes 'HIGH' only during execution of a recording operation to turn ON this transistor 31.

Functions and operations of this optical printer will now be described with reference to a timing chart of FIG. 19.

When a recording operation is to take place with input of a print command, a lamp 103 is turned ON and each one line amount of image data is inputted to the first driving circuit 29 and latched therein. Then, in response to the clock singal CK, the driver 20 selectively applies the voltage V1 to the individual electrodes 13 in accordance with the latched image data. In this condition, since the signal S1 inputted to the second driving circuit 30 is 'H', the common electrode 12 is grounded. Therefore, between those electrodes 13 applied with the positive voltage V1 and the grounded electrodes 12, there is generated an electric field E1 of a predetermined direction. And, this electric field E1 acts to energize a desired light element(s) 11 for light transmission therethrough. On the other hand, between the other electrodes 13 which were not applied with the voltage V1 and the common electrode 12, no electric field is generated. Thus, the light shutter elements 11 corresponding to the latter electrodes 13 remain OFF to block off the incident light. This ON/OFF control of the light shutter elements 11 is executed in synchronism with rotation of a photosensitive member 107, and the control is executed for each one line amount of image data and the execution is repeated until completion of one page amount of image recording operation.

With completion of one page amount of image recording operation, during a waiting period which lasts until start of recording operation of the next page, the signal S1 to the second driving circuit 30 is maintained at 'L' and the clock signal CK is maintained at 'L' as well. Accordingly, during this waiting period, the transistor 32 is energized to apply the positive voltage V2 to the common electrode 12 while all the individual electrodes 13 are kept grounded, so that between the common electrode 12 and the individual electrodes 13 there is generated an electric field E2 of a direction opposite to that of the electric field E1 generated during the recording period. This electric field E2 acts to energize all the light shutter elements 11. Accordingly, during this waiting period, the incident light is transmitted through all the light shutter elements 11 of the light shutter array 10 onto the surface of the photosensitive member 107 for eliminating unnecessary charge thereon.

In this embodiment, as described above, during a waiting period, the electric field E2, of which direction is opposite to that of the electric field E1 applied during a recording period, is applied to the light shutter array 10. With this control scheme, as depicted by a broken line in FIG. 20, there occurs substantially no variation in the driving voltage/transmission light amount characteristics of the array 10 after use for an extended period (continuous use for four hours), relative to the initial characteristics of the same depicted by a solid line in FIG. 20. An alternate long and short dash line in this FIG. 20 denotes further characteristics of the light shutter array 10 after continuous use for the same period (four hours) when no electric field is applied to the shutter array 10 during the waiting period. These data of FIG. 20 were obtained under the conditions specified below; namely, peripheral speed of photosensitive member 107: 18 cm/sec.

duty ratio d of clock signal CK during a recording period: d (=t1/t2): 50% one page recording period T1: 1.1 sec. (size A4 lateral)

waiting period T2: 0.8 sec.

voltage V2: 28 V

Incidentally, the optimum intensity of the electric field applied to the light shutter array 10 during the waiting period depends on the intensity and period of the electric field application to the light shutter array 10 during the recording period. More specifically, the optimum intensity depends on the voltage V1, a duty ratio d of the clock signal during the recording period and on a ratio D (=T1/T2) between the recording period and the waiting period. For instance, supposing now V1 =48 V, T1 =1.1 sec. and T2 =0.8 sec., a value of the voltage V 2 for obtaining the electric field of the optimum intensity to be applied during the waiting period varies in direct proportion to the value of the duty ratio d, as illustrated in FIG. 21.

In the above embodiment (5), the positive voltage V1 is applied to the individual electrodes 13 during a recording period. Whereas, during a waiting period, the further positive voltage V2 is applied to the common electrode 12. Instead, for switching over the direction of the electric field applied to the light shutter array 10 between the recording period and the waiting period, it is also conceivable to switch over the polarity of the voltage to be applied to the individual electrodes 13 between the recording period and the waiting period while keeping the common electrode 12 grounded in either period.

As may be understood from the above, according to the driving method of this embodiment (5), there occurs substantially no disadvantageous variation in the driving voltage/transmission light amount characteristics of the light shutter array even after a plurality of times of recording operations. Consequently, the light shutter array can always carry out an exposing operation in a stable manner.

Further, according to the construction of FIG. 18, the direct current electric field is continously applied to the light shutter elements 11 from completion of a recording period to start of a waiting period (see FIG. 19). Alternately, the applied voltage can be in the form of pulse. In this case, as illustrated in FIG. 22, the base of the transistor 31 is connected with an output terminal of a NAND gate which receives an inverted signal of the signal S1 and a second clock signal CK'. With this construction, as illustrated in a timing chart of FIG. 23, during a waiting period, an electric field corresponding to the voltage V2 is applied, in synchronism with the second clock signal CK', to the light shutter elements 11. The optimum intensity of this electric field applied to the shutter element 11 during the waiting period can be expressed, in terms of the applied voltage V2, by:

$$V2 \propto V1(t1 \cdot t4 \cdot T1)/(t2 \cdot t3 \cdot T2)$$

Further, in this embodiment (5), the direction of the direct current electric field acting on the light shutter element 11 is switched over between the waiting period and the recording period. Then, if intensity of the electric field of the waiting period is substantially equal to that of the recording period, the light shutter element 11 allows the incident light to pass therethrough to reach and expose the surface of the photosensitive member. For this reason, if this driving method of the embodiment (5) is used in an optical printer employing the normal developing method in which toner material is affixed to unexposed (i.e. undischarged) portions of the photosensitive member surface, the method can eliminate the excess charge remaining between images formed on the photosensitive member surface during the recording period. In this case, it is to be noted, the electric field applied to the light shutter during the waiting period will have such an intensity as enough to cause the light shutter to pass the light to reach the photosensitive member surface for eliminating the remaining charge thereon. For instance, if the construction of FIG. 22 is to be utilized, the following conditions should preferably be satisfied; namely, $$V1 = V2 \quad (1)$$

$$d' \geq d$$

(where, $d = t1/t2$, $d' = t3/t4$)

If the above condition (1) is satisfied, i.e., the voltages V1 and V2 have the same value, the power can be supplied from the same source. In this case, the common value of the voltages V1 and V2 should be so set as to obtain the maximum transmission light amount for optimizing the power consumption efficiency. If the condition (2) is satisfied, the excess charge on the photosensitive member can be effectively eliminated during the waiting period. For satisfying these conditions (1) and (2), the voltage V2 and the duty ratio d' should be set at optimum values for avoiding fatigue of the light shutter, while varying the ratio D between the recording period T1 and the waiting period T2.

On the other hand, in an electrophotographic printer, the inversed developing method is often used in which the toner material is affixed to exposed portions of the photosensitive member surface. Then, if the driving method of the embodiment (5) is used with such inversed developing method, there is possibility of waste of toner material if the photosensitive member is exposed during the waiting period when no image has been yet formed on the photosensitive member. To prevent occurance of this inconvenience, it is conceivable to apply the light shutter element 11 with a voltage lower than a threshold voltage (about 30 V) at which the transmission light amount value starts rising in the voltage/transmission light amount characteristics curve (FIG. 20) of the light shutter. With this arrangement, the intensity of the direct current electric field applied to the light shutter element 11 during the waiting period can be set within such magnitude as substantially prevents the light shutter element 11 from transmitting the incident light to the photosensitive member. As described hereinbefore, the value of the voltage V2 varies in proportion to the ratio D between the recording period T1 and the waiting period T2 or on the duty ratio d of the clock pulse CK. Therefore, the optimum value of this voltage V2 for best avoiding fatigue of the light shutter 11 can be determined by varying the values of these factors D and d.

Embodiment (6)

This embodiment uses the same circuit construction as the embodiment (3) shown in FIG. 11.

The differences are feeding method of the data DATA 1 and timings of clock signals CLOCK2 and CLOCK3. Also, with the different timing, in this embodiment, the clock signal CLOCK2 is provided independently of the latch signal LATCH.

Functions and operations of the construction of this embodiment will now be described with reference to a timing chart of FIG. 24. As shown, in this embodiment (6), the signal CLOCK2 is inputted to the first flip-flop FF1 for toggling its output Q, at the timing of completion of one page amount of recording operation. As described hereinbefore regarding to the embodiment (3), when the output Q of the flip-flop FF1 is 'L', the XOR gate 26 outputs data DATA2 of the same phase as the data DATA1. Whereas, when the output Q is 'H', the XOR gate 26 outputs data DATA2 of the opposite phase to the data DATA1. On the other hand, with the same timing as the clock signal CLOCK2, the clock signal CLOCK3 is inputted to the flip-flop FF2 for toggling its output Q. Specifically, in response to this clock signal CLOCK3, the output Q of the flip-flop FF2 is switched to 'L' when the DATA2 is of the same phase as data DATA1. Whereas, the output Q is switched to 'H' when the data DATA2 is of the opposite phase to the data DATA1. These toggling actions of the flip-flop FF2 result in corresponding switchovers of the direction of the electric field applied to the light shutter element 11, as described hereinbefore regarding to the embodiment (3). In this embodiment (6), this switchover operation of the electric field direction is synchronized with completion of one page amount of recording operation. Whereas, during the waiting period, such an electric field is applied to the light shutter element 11 as based on the data DATA1 used in the recording period immediately before this waiting period. That is to say, with completion of one page amount of recording operation, the data DATA1 is fed again. By this scheme, it is possible to cause the number of the times of electric field application to all the light shutter elements 11 during the waiting period to agree to that during the recording period. With this agreement of the numbers of applications during the two periods, it becomes eventually possible to properly recover all the light shutter elements 11 from the fatigue depending on the degree of the fatigue of each light shutter element 11.

Figure 1:
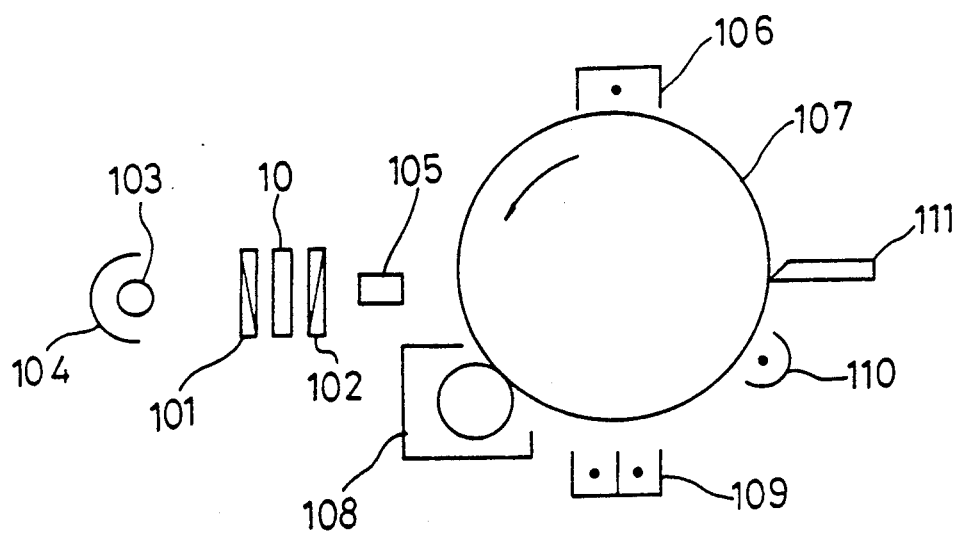
Figure 2:
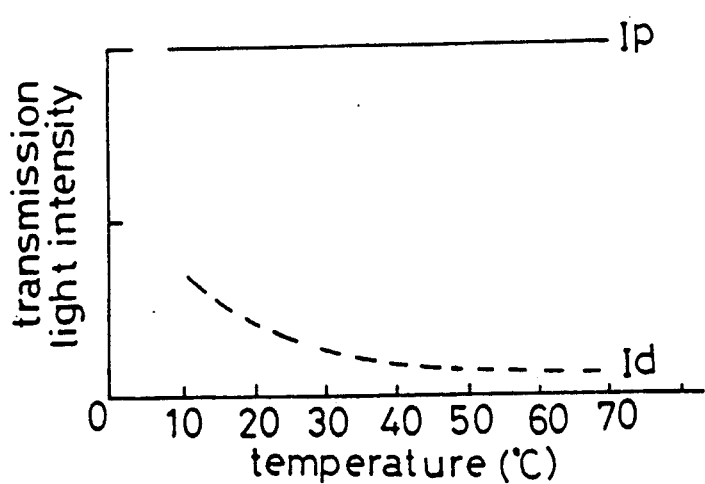
Figure 3:
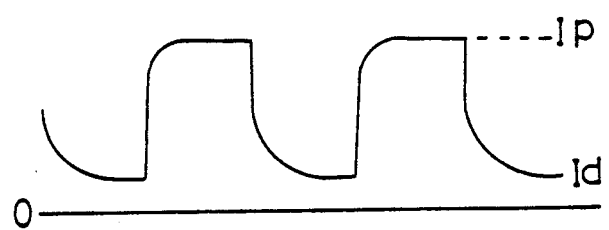
Figure 4:
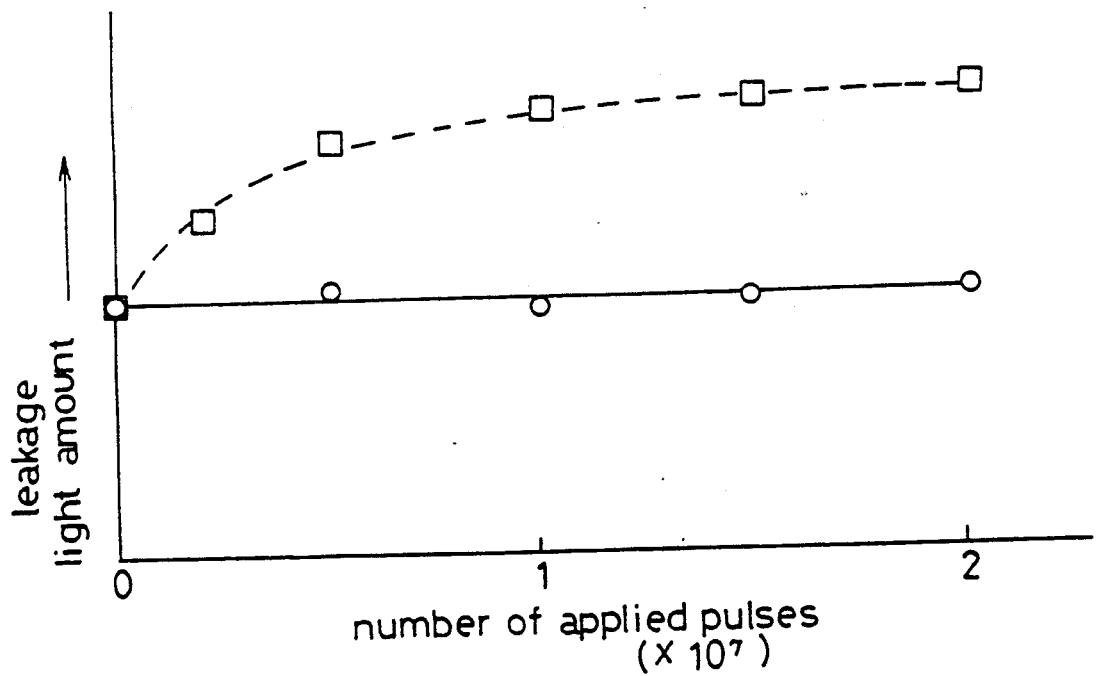
Figure 5:
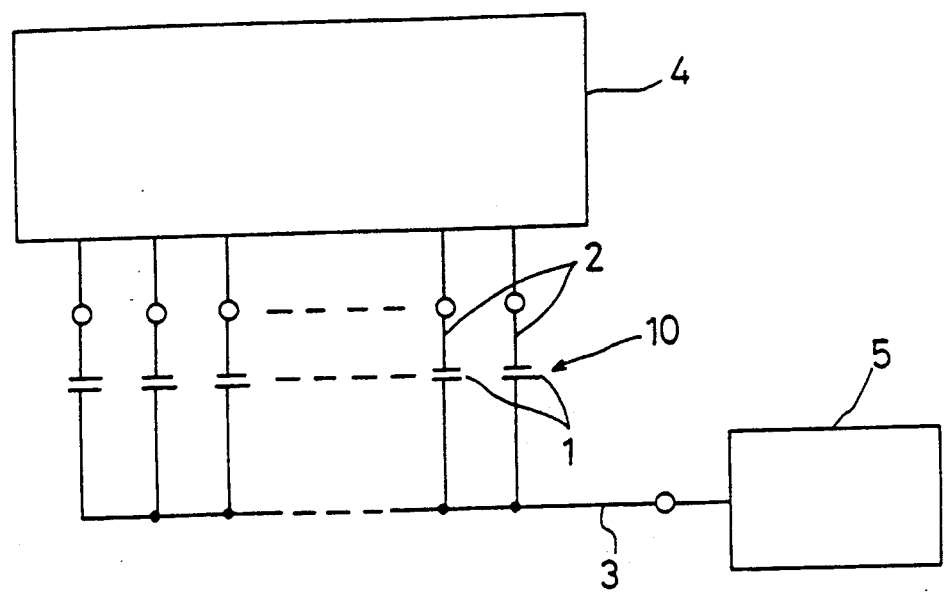
Figure 6A:
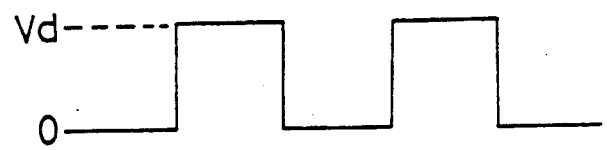
Figure 6B:
Figure 6C:
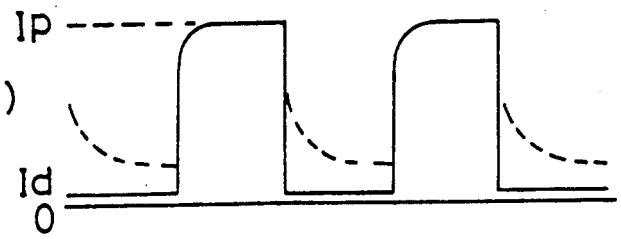
Figure 9A:
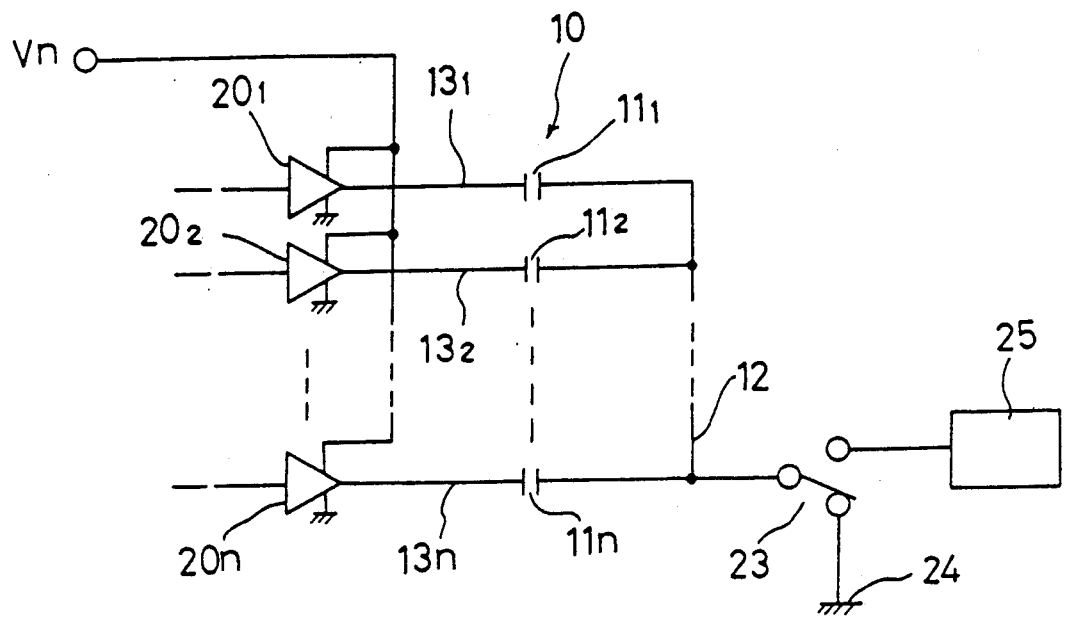
Figure 9B:
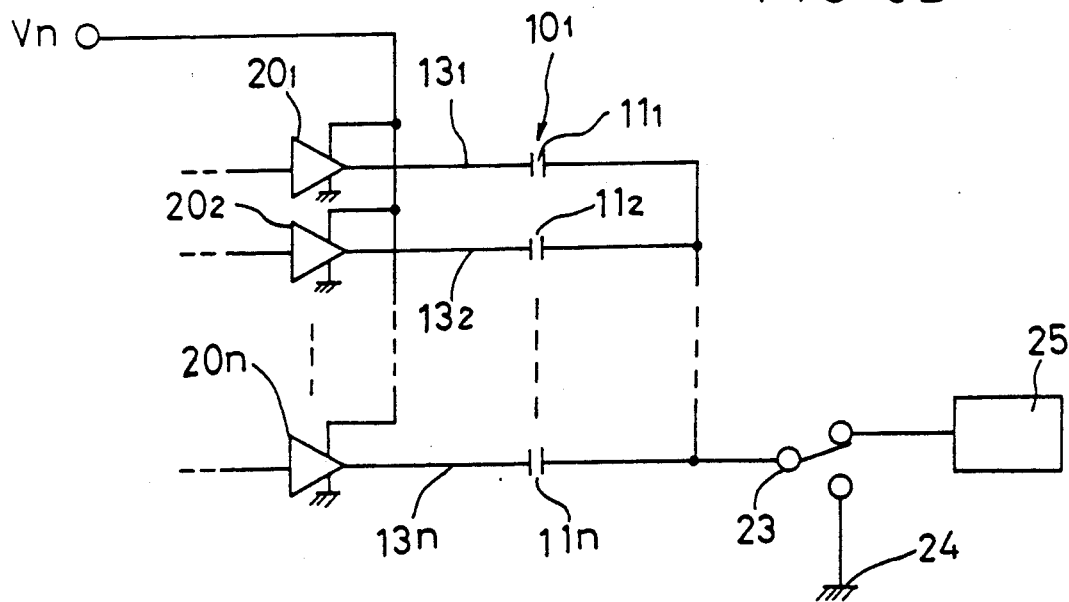
Figure 10:
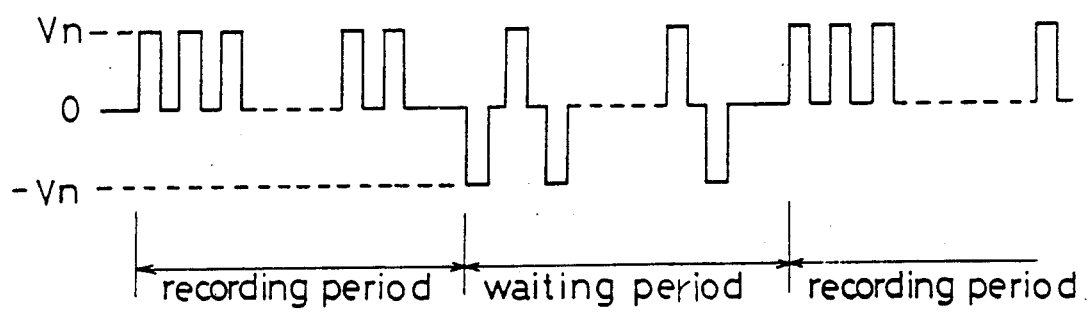
Figure 11:
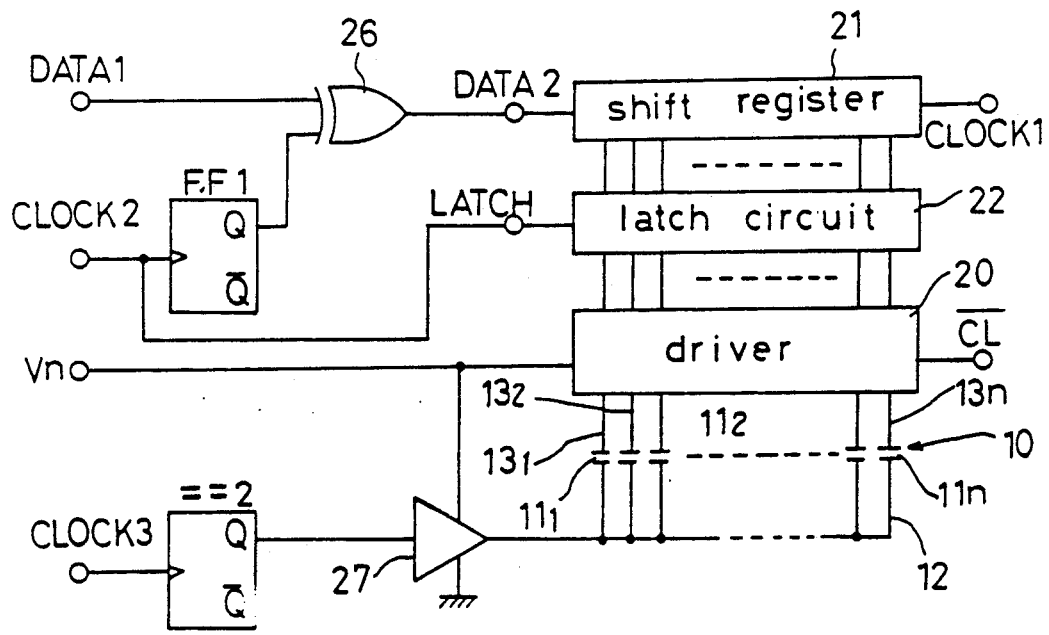
Figure 12:
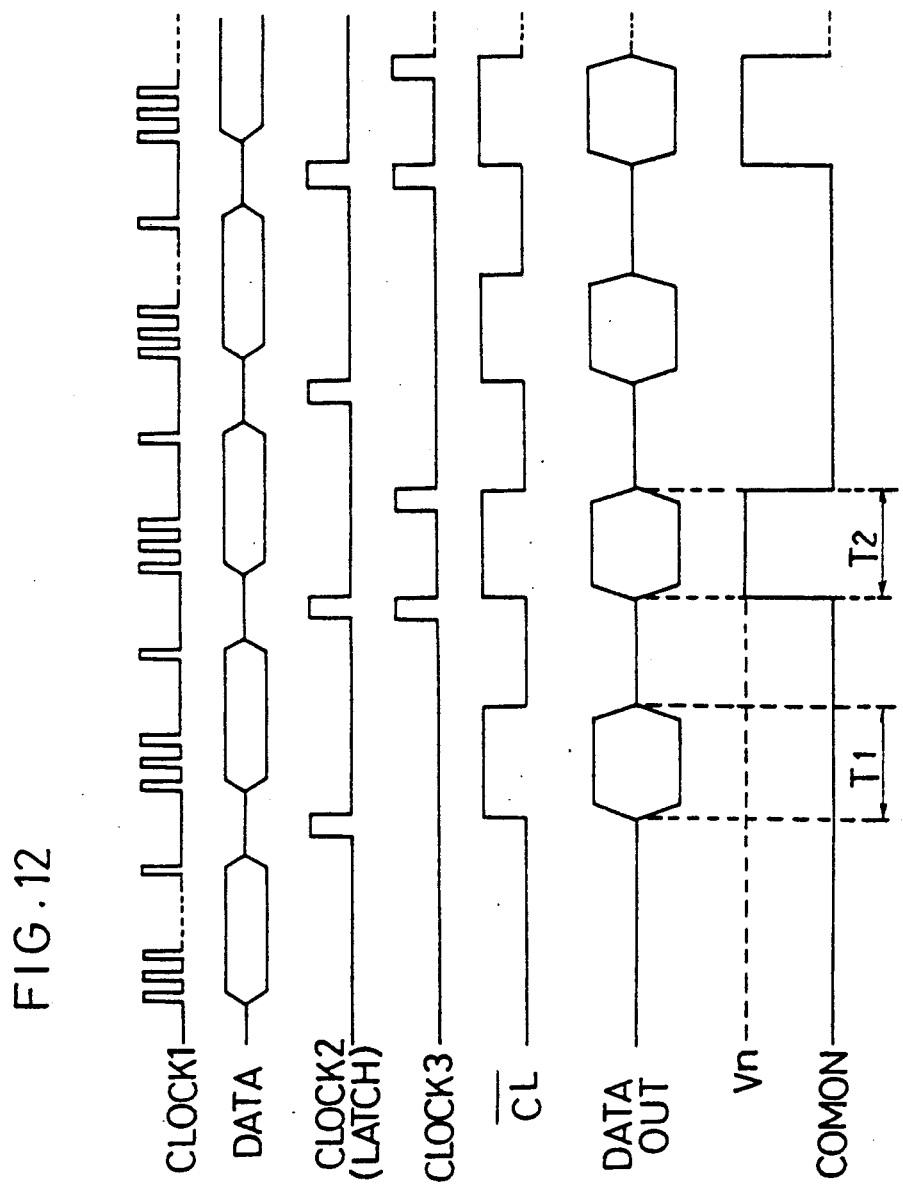
Figure 13A:
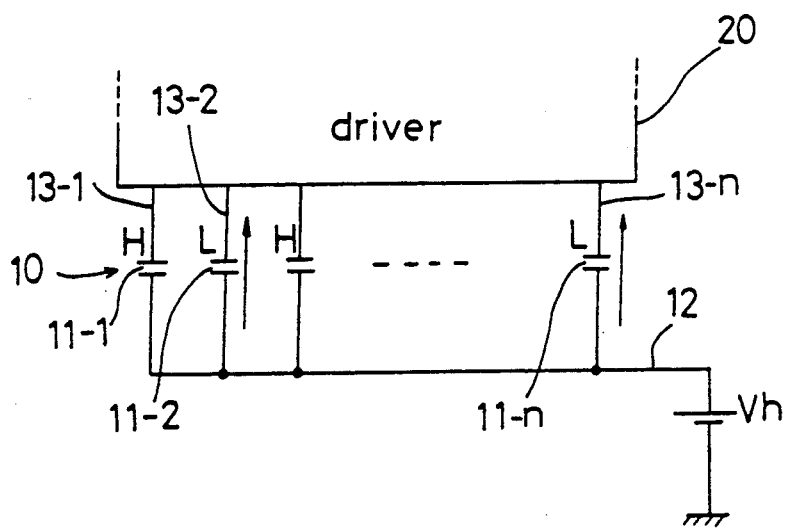
Figure 13B:
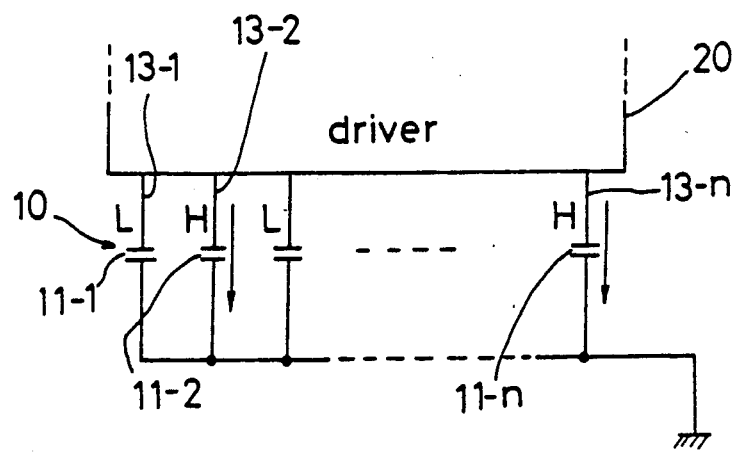
Figure 14:
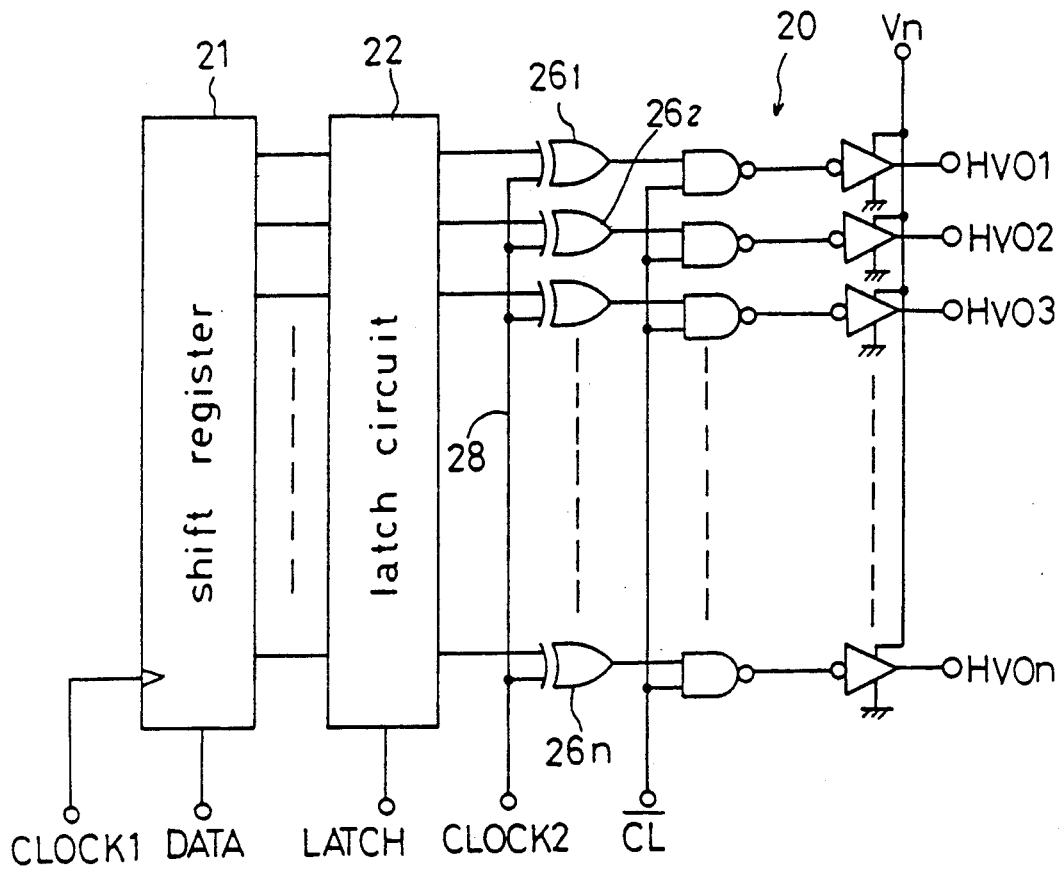
Figure 15:
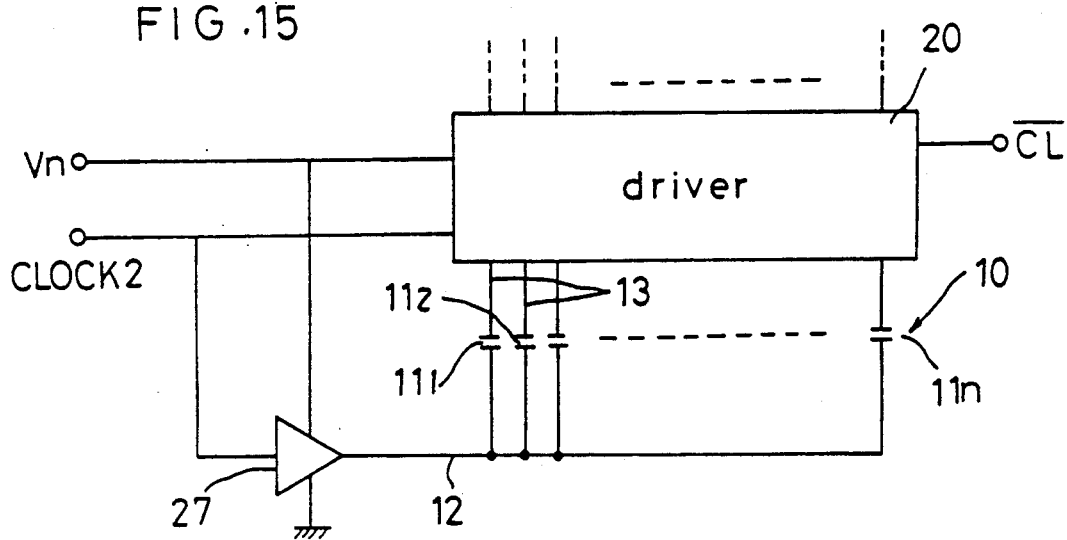
Figure 16:
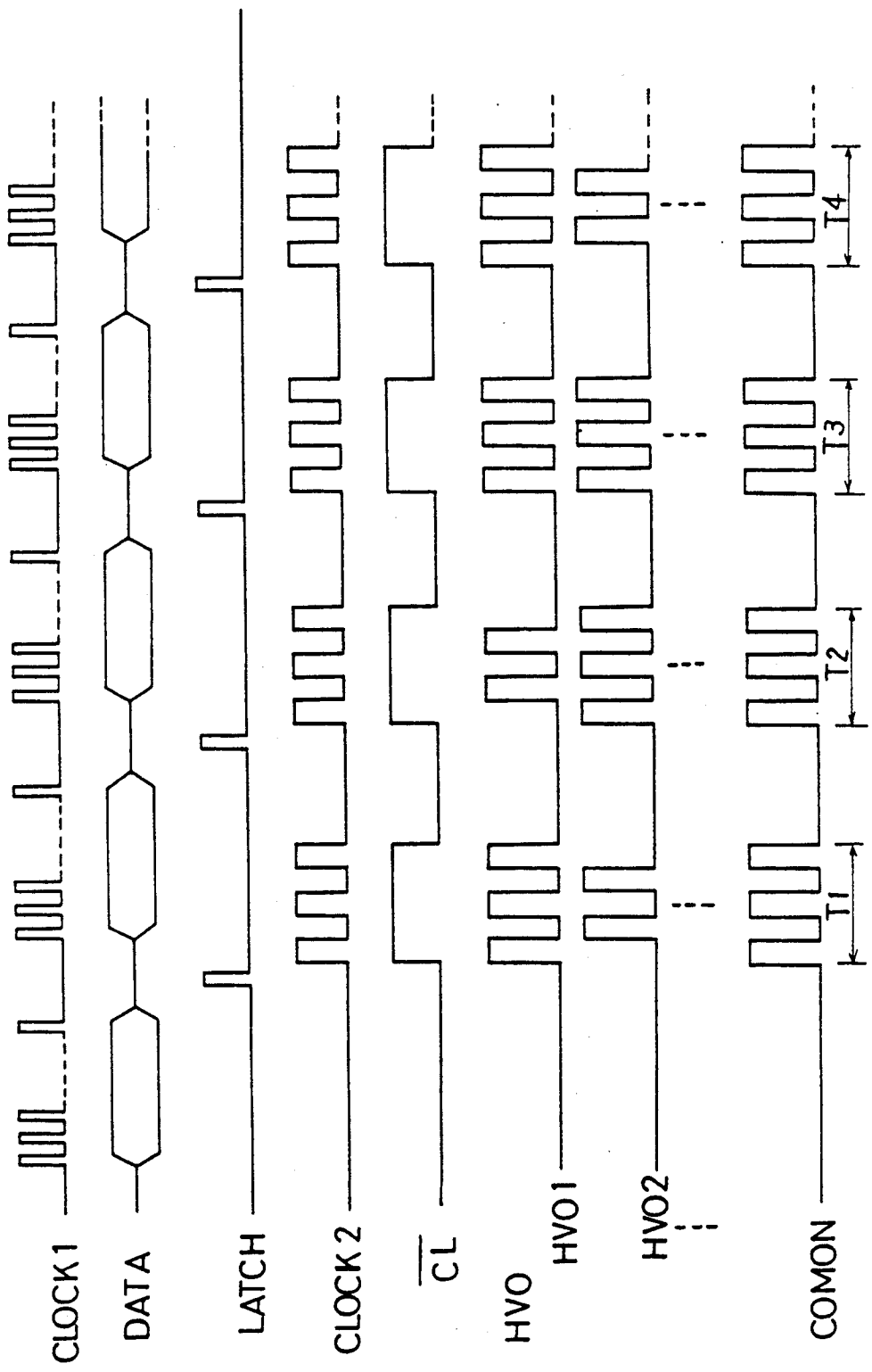
Figure 17:
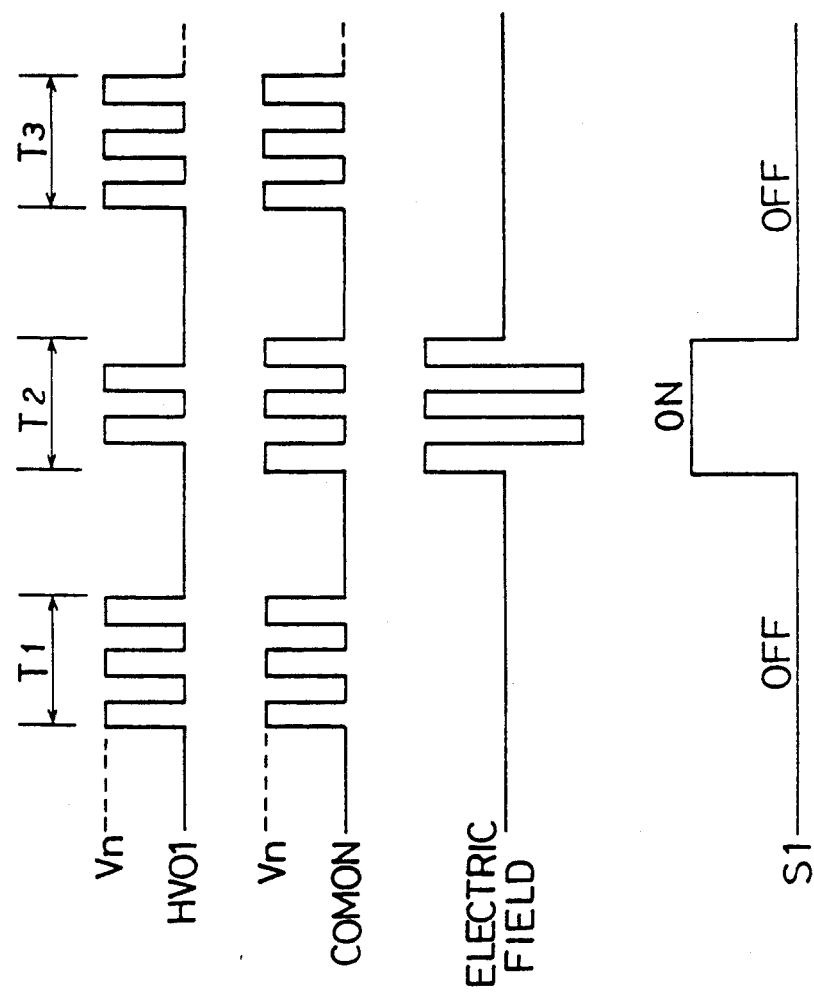
Figure 18:
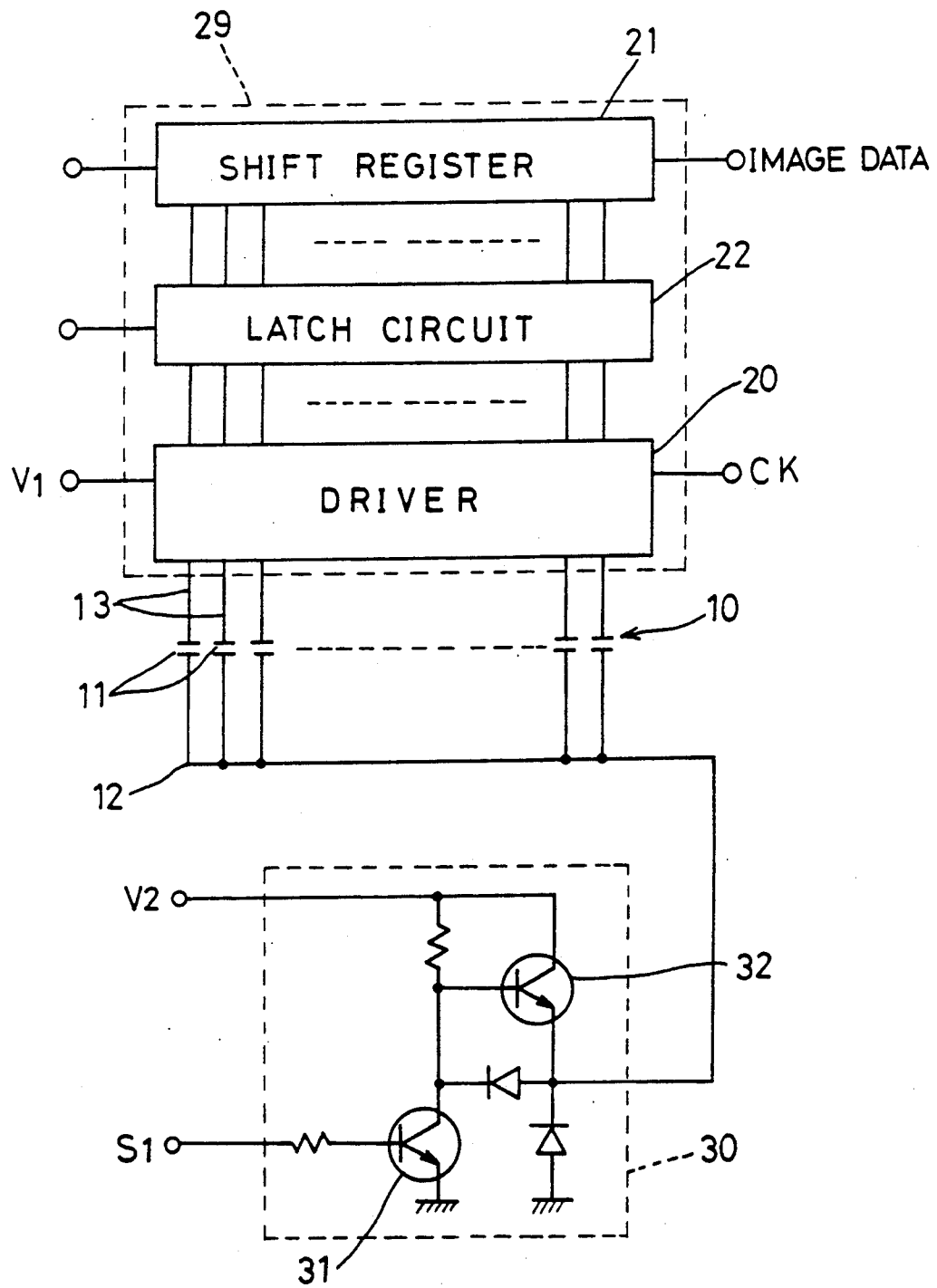
Figure 19:
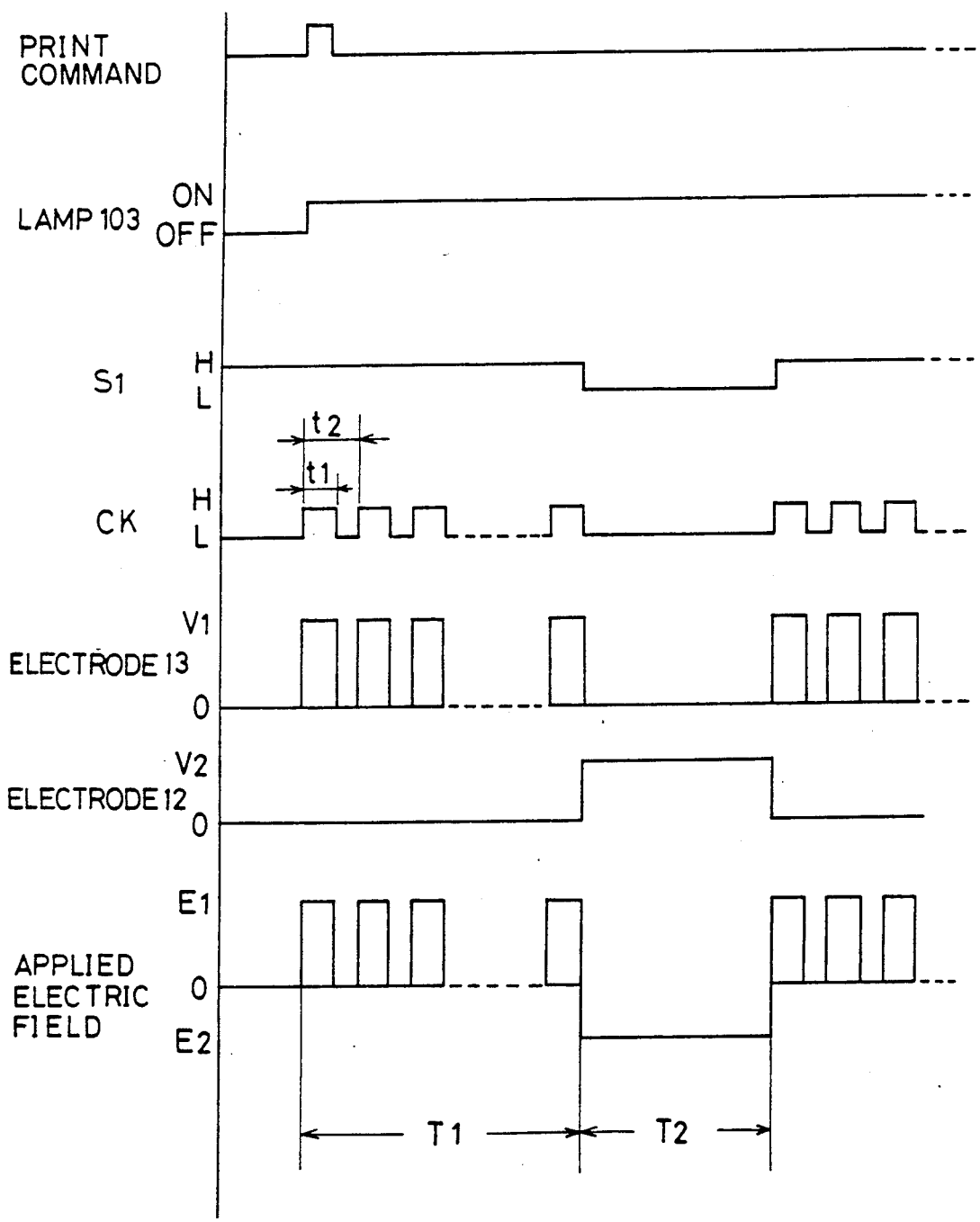
Figure 20:
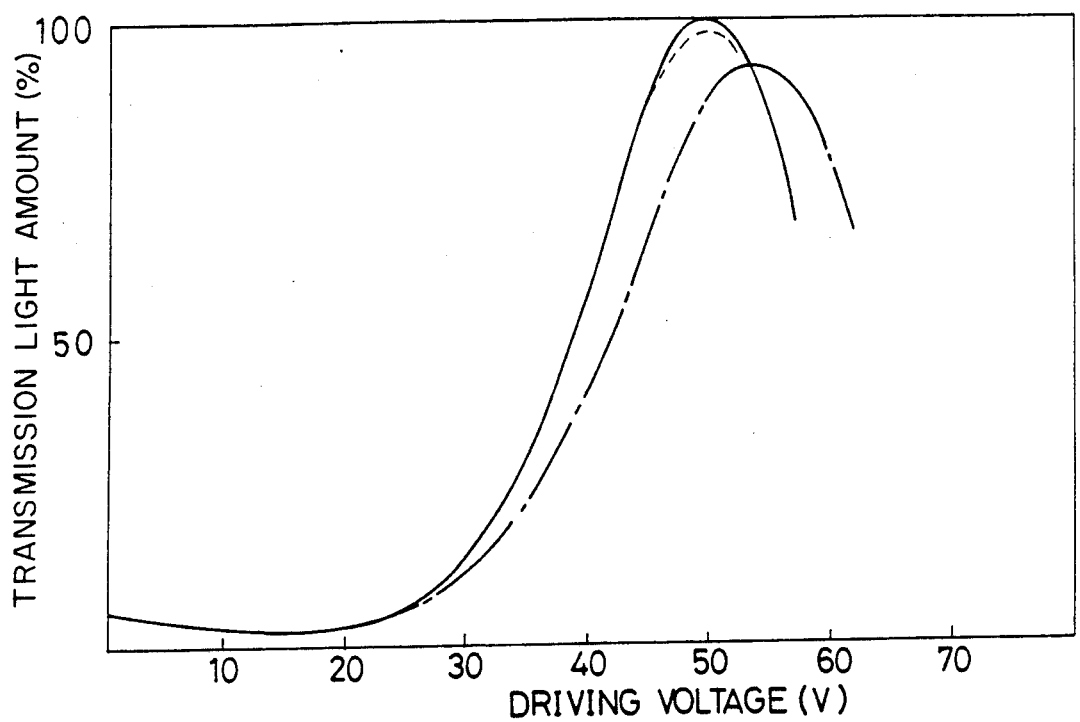
Figure 21:
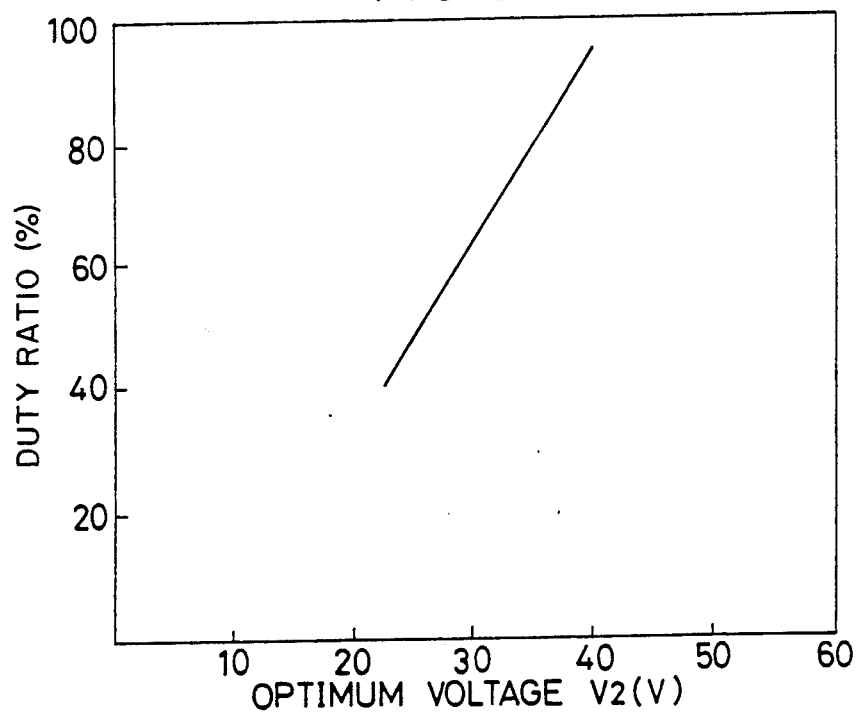
Figure 22:
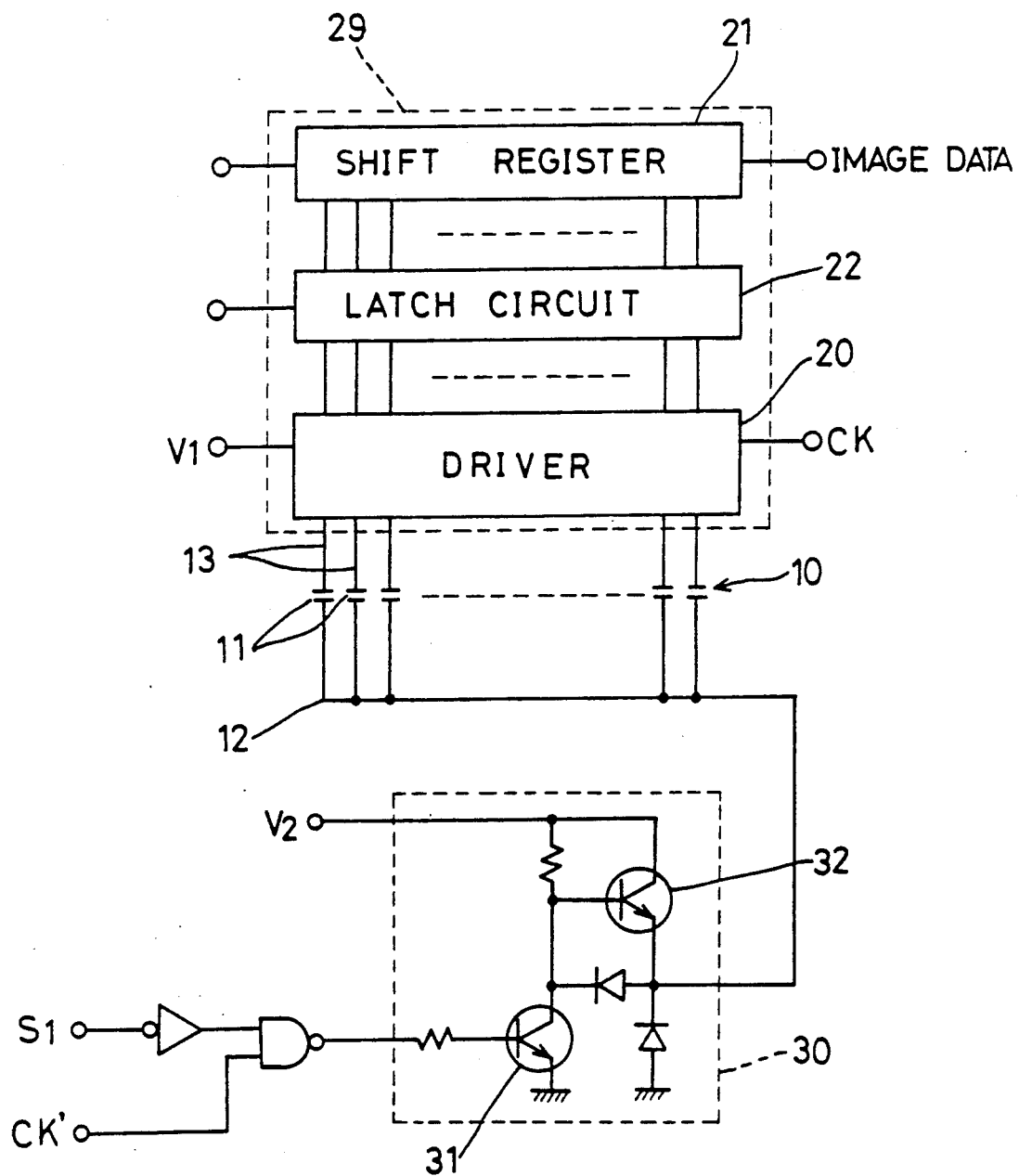
Figure 23:
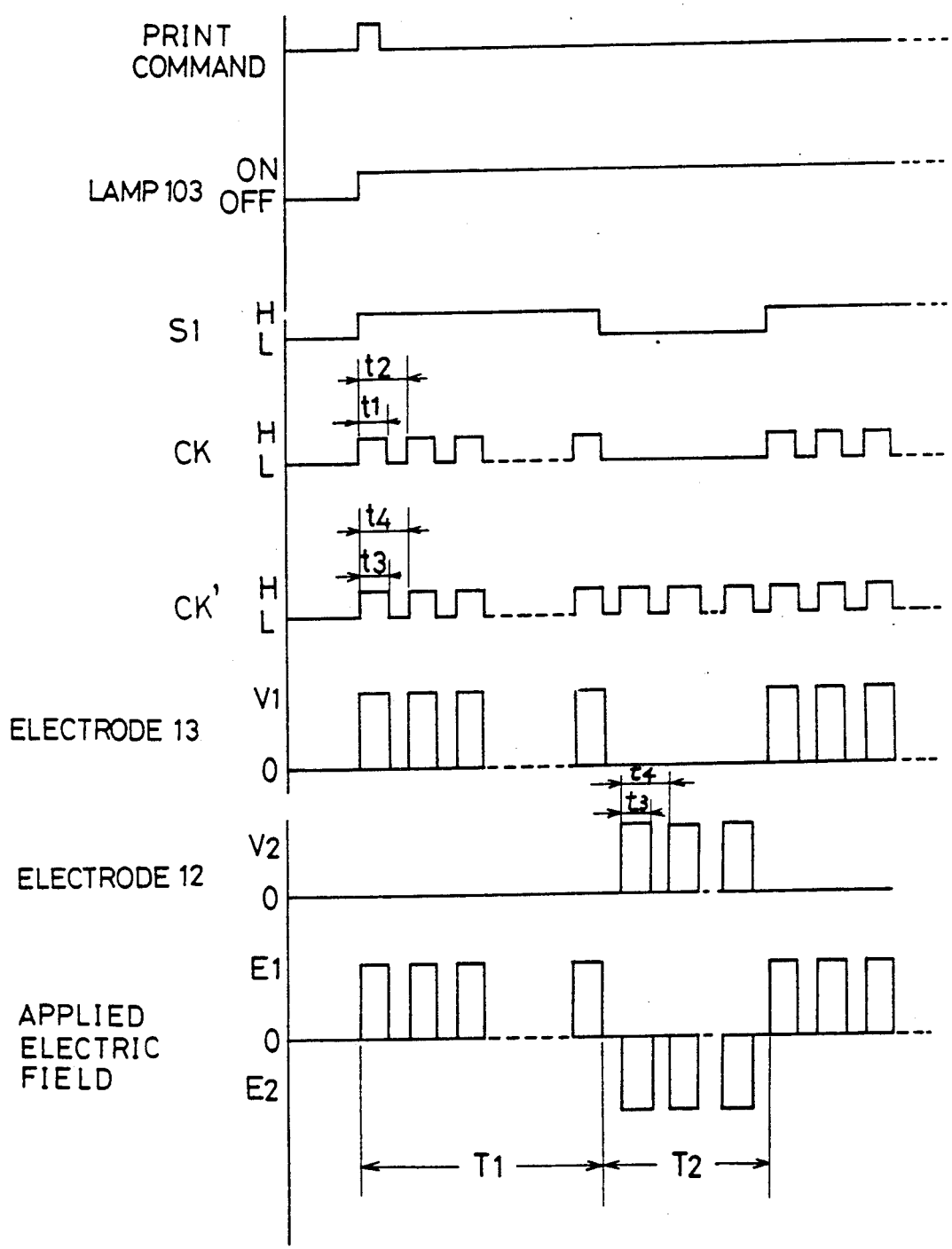
Figure 24:
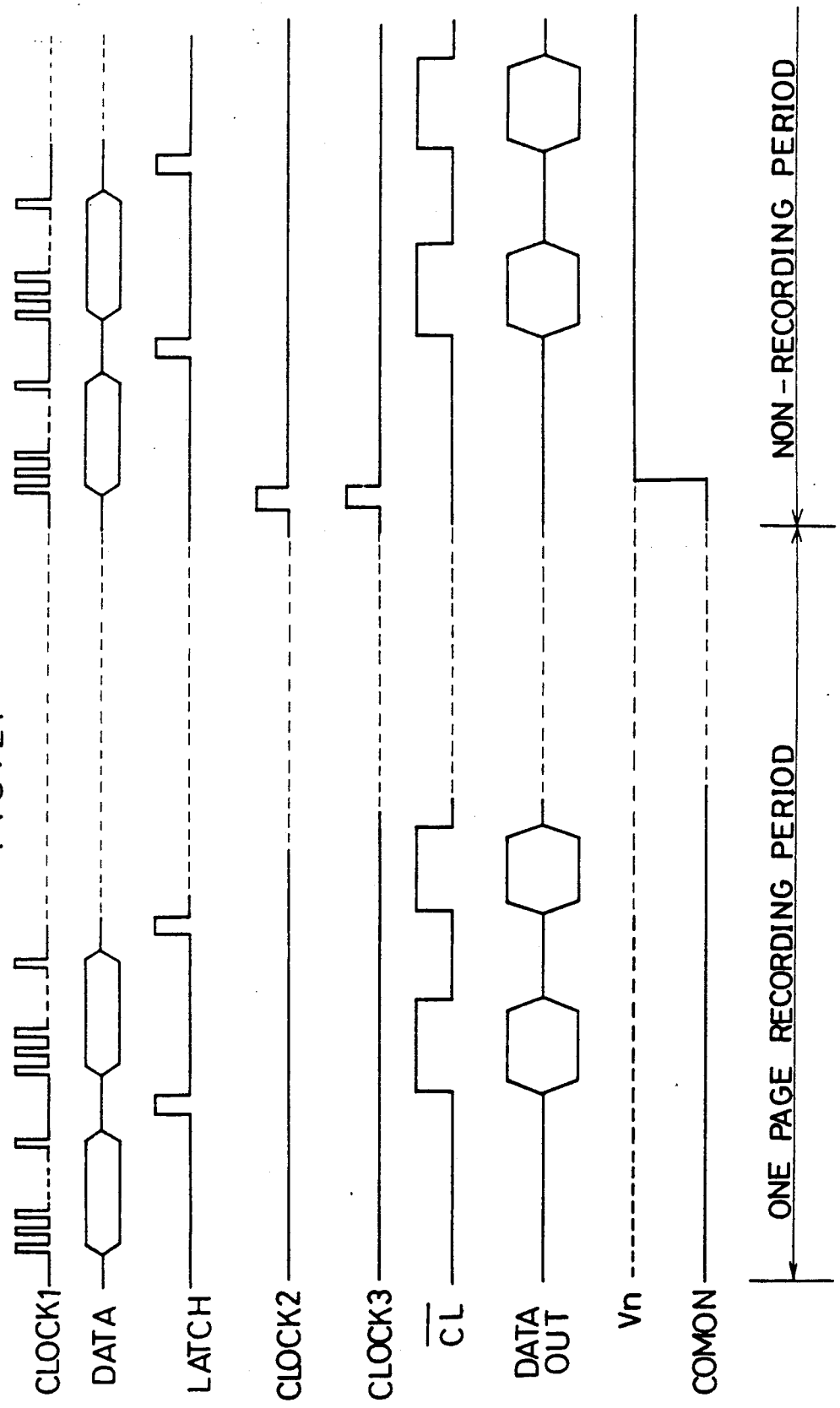
Figure 25:
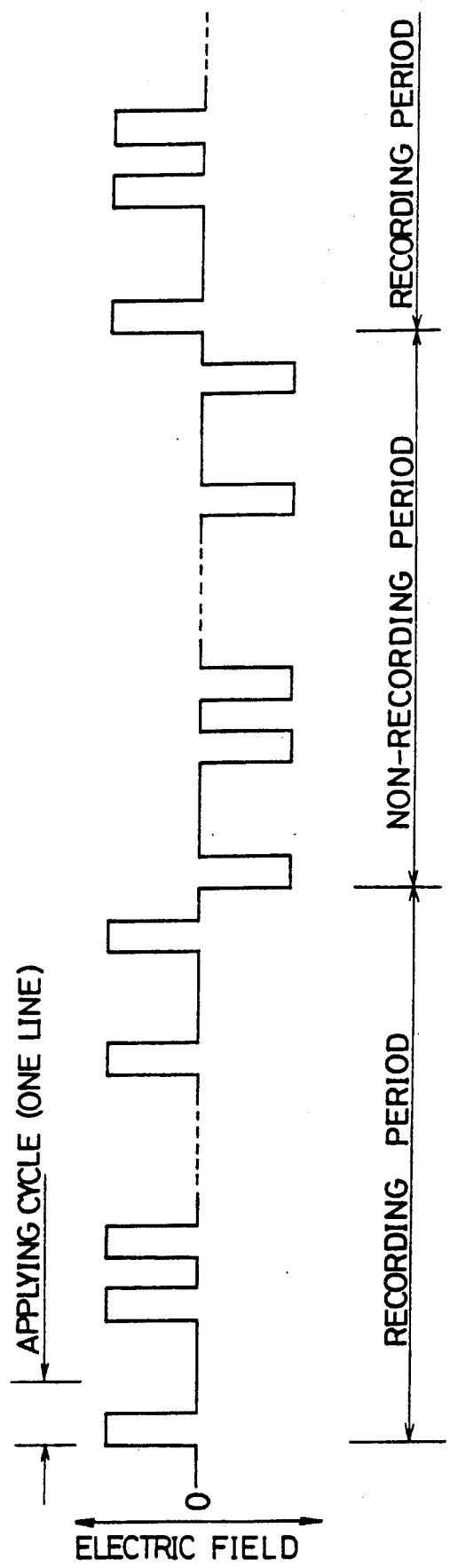
FIG. 25 illustrates one example of time variation of the electric field applied to the light shutter element 11. In this drawing, the recording period T1 has substantially the same length as the waiting period T2, whereby the duty ratios (the ratio between the cycle of electric field application and the pulse width) in these two periods are both 50%.
Figure 26:
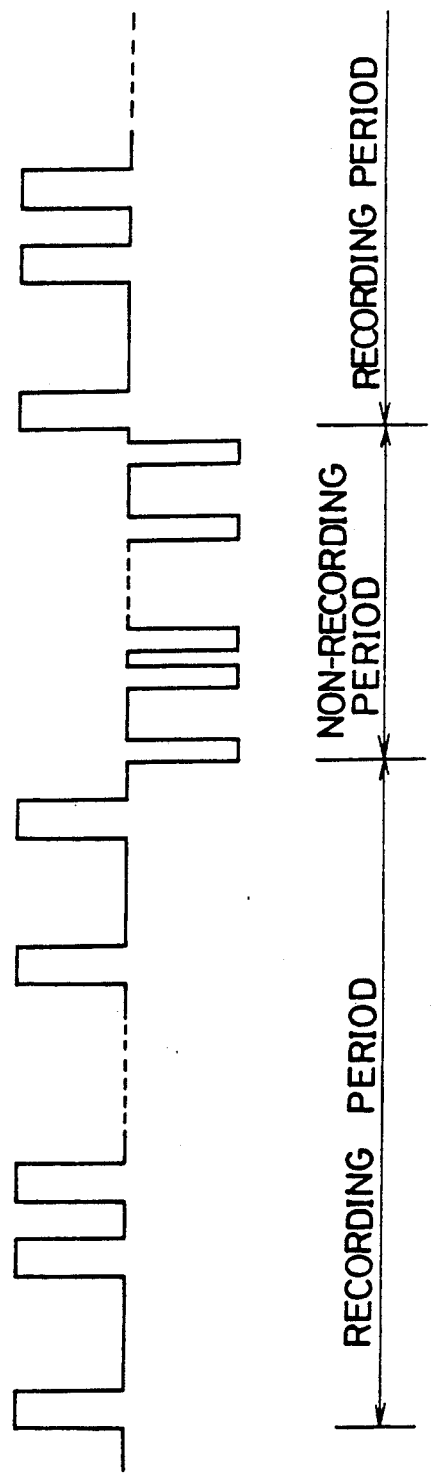
FIG. 26 shows a modified arrangement where the waiting period T2 is rendered shorter than the recording period T1 with maintaining the duty ratios of the both two periods at 50%. This arrangement is advantageous in that the period needed for a continous recording operation can be shorter than the arrangement of FIG. 25.
Figure 27:
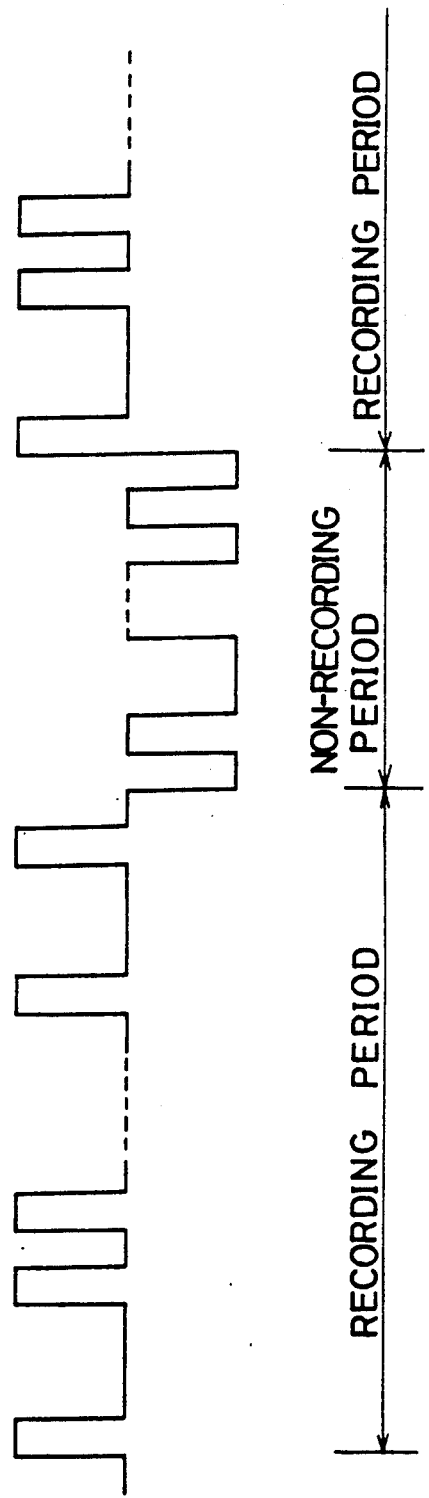

FIG. 27 shows a further modified arrangement. In this arrangement, the waiting period T2 is rendered shorter than the recording period T1 again. In this arragement; however, the duty ratios of the two periods are caused to differ from each other for further promoting recovery of the light shutter element 11 from the fatigue. That is, with the foregoing arrangement of FIG. 26, if the waiting period T2 is rendered too shorter than the recording period T1 without changing the duty ratios of these periods, the light shutter element 11 may not recover from the fatigue sufficiently. For this reason, in this further modified arrangement of FIG. 27, by setting the duty ratio of the recording period T1 at 50% and setting at of the waiting period T2 at 100%, the period of electric field application during the waiting period is extensed to its maximum for avoiding such insufficint recovery of the light shutter element 11.

The invention may be embodiet in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of driving a light shutter for use in a recording apparatus, the light shutter being formed of a solid dielectric material having an electro-optical effect polarize an incident light by applying an electric field thereto, the light shutter modulating the incident light according to recording data to form an image, said method comprising the steps of:
    applying a first electric field to the solid dielectric material light shutter according to the recording data for modulating the incident light and tending to create a residual electric field; and
    applying a second electric field to the solid dielectric material light shutter after at least one said first electric field applying step, said second electric field having a direction opposite to that of said first electric field and substantially reducing said residual electric field.

2. A method as claimed in claim 1, wherein said second electric field is continuously applied to the light shutter from completion of one recording step to start of with next recording step.

3. A method as claimed in claim 1, wherein said second electric field is applied to the light shutter in the form of a pulse.

4. A method as claimed in claim 1, wherein said second electric field is a part of an alternating field.

5. A method of driving a light shutter array for use in a recording apparatus, the light shutter array having a plurality of light shutter elements aligned in a row, each of said light shutter elements being formed of a solid dielectric material having an electro-optical effect to polarize an incident light by applying an electric field thereto, said solid dielectric material light shutter array modulating the incident light according to recording data to form an image on a photosensitive member, said method comprising the steps of:
    applying a first electric field to the solid dielectric material light shutter elements to be energized according to the recording data for modulating the incident light and tending to create a residual electric field; and
    applying a second electric field to the solid dielectric material light shutter elements after at least one said first electric field applying step, said second electric field having a direction opposite to that of said first electric field and substantially reducing said residual electric field.

6. A method as claimed in claim 5, wherein said second electric field is continuously applied to the light shutter elements from completion of one recording step to start of the next recording step.

7. A method as claimed in claim 5, wherein said second electric field is applied to the light shutter elements in the form of a pulse.

8. A method of driving a light shutter for use in an electrophotographic recording apparatus, said light shutter being formed of a solid dielectric material having an electro-optical effect to polarize an incident light by applying an electric field thereto, said solid dielectric material light shutter modulating the incident light according to recording data to form an electrostatic latent image on a photosensitive member, said apparatus causing toner material to affix to an exposed portion of the photosensitive member, said method comprising the steps of:
    applying a first electric field to the solid dielectric material light shutter according to the recording data for modulating the incident light and tending to create a residual electric field; and
    applying a second electric field to the solid dielectric material light shutter after said at least one first electric field applying step, said second electric field having a direction opposite to that of said first electric field and an intensity to prevent the solid dielectric material light shutter from transmitting the incident light to the photosensitive member and substantially reducing said residual electric field.

9. A method of driving a light shutter for use in an electrophotographic recording apparatus, said light shutter being formed of a solid dielectric material having an electro-optical effect to polarize an incident light by applying an electric field thereto, the solid dielectric material light shutter modulating the incident light according to recording data to form an electrostatic latent image on a photosensitive member, said apparatus causing toner material to affix to a non-exposed portion of the photosensitive member, said method comprising the steps of:
    applying a first electric field to the solid dielectric material light shutter according to the recording data for modulating the incident light and tending to create a residual electric field; and
    applying a second electric field to the solid dielectric material light shutter after at least one said first electric field applying step, said second electric field having a direction opposite to that of said first electric field and an intensity for causing the solid dielectric material light shutter to transmit the incident light to the photosensitive member and substantially reducing said residual electric field.

10. A method of driving a light shutter for use in a recording apparatus, said light shutter being formed of a solid dielectric material having an electro-optical effect to polarize an incident light by applying an electric field thereto, the solid dielectric material light shutter modulating the incident light according to recording data to form an image, said method comprising the steps of:

applying a first electric field to the solid dielectric material light shutter according to the recording data for modulating the incident light and tending to create a residual electric field; and applying a second electric field to the solid dielectric material light shutter, after at least one said first electric field applying step, according to the recording data used in the recording step, said second electric field having a direction opposite to that of said first electric field and substantially reducing said residual electric field.

11. A method as claimed in claim 10, wherein said second electric field applying step has a time period shorter than that of said recording step.

12. A driving device for a light shutter array having a plurality of light shutter elements aligned in a row, each of the light shutter elements being formed of a solid dielectric material having an electro-optical effect to polarize an incident light by applying an electric field thereto, said device comprising:

a plurality of individual electrodes each of which is provided on the wall of the respective solid dielectric material light shutter element;

a common electrode provided on the opposite walls of the solid dielectric material light shutter elements electrically in common so as to oppose to said individual electrodes;

means for applying a first driving voltage in the form of a pulse to the individual electrodes of the solid dielectric material light shutter elements to be energized according to recording data for turning ON/OFF the respective solid dielectric material light shutter elements in a recording period for forming an image according to said recording data and tending to create a residual electric field, and for applying a second driving voltage in the form of a pulse to the individual electrodes of the solid dielectric material light shutter elements according to the inverted data of said recording data in a waiting period following said recording period; and means for grounding the common electrode in said recording period, and for applying a same voltage as the second driving voltage to the common electrode in said waiting period and substantially reducing said residual electric field.

13. A driving device as claimed in claim 12, wherein said waiting period is shorter than said recording period.

14. A driving device as claimed in claim 13, wherein said second driving voltage has a duty ratio greater than that of said first driving voltage.

* * * * *